March 26, 1940.  S. P. NEUHAUSEN  2,194,716
HAND IMPLEMENT
Filed Aug. 4, 1938
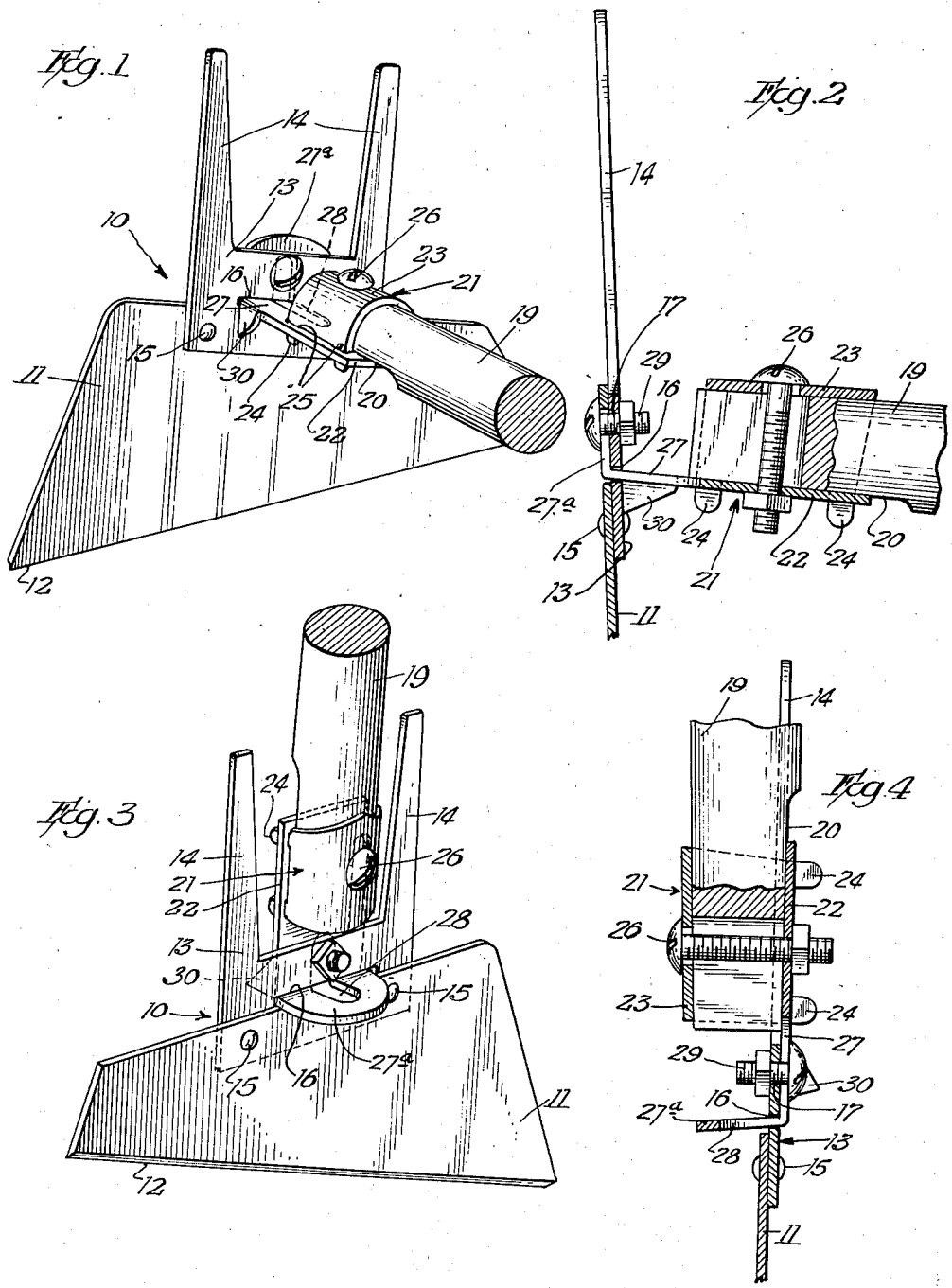
Inventor
Sebastian P. Neuhausen
By Sheridan, Davis & Cargill
Attys Patented Mar. 26, 1940

2,194,716

UNITED STATES PATENT OFFICE 2,194,716

HAND IMPLEMENT

Sebastian P. Neuhausen, Lombard, Ill.

Application August 4, 1938, Serial No. 222,947

1 Claim. (Cl. 306—6)

This invention relates to improvements in hand implements.

One object of the invention is to provide a hand-operable implement or tool comprising a handle and having means for attaching thereto a head in either of two positions whereby the head can be used in performing different operations.

In the embodiment of the invention herein illustrated, an earth-working head comprising oppositely directed tines or prongs and a blade is shown, the blade being adapted for uses other than earth-working when desired.

In the drawing:

Fig. 1 is a broken perspective view of an implement embodying the present improvements;

Fig. 2 is a side elevation thereof partly in section;

Fig. 3 is a broken perspective of the implement showing the head in a position different from that shown in Figs. 1 and 2; and Fig. 4 is a broken side elevation of the implement shown in Fig. 3 but partially in section.

In the drawing, the head 10 is shown as comprising a blade 11 provided with a cutting edge 12 and a portion 13 provided with a plurality of tines or prongs 14 extending in a direction away from the cutting edge of the blade usable as a rake, if desired.

In the form of the invention shown in the drawing, the member 13 is shown as being attached to the blade 11 by rivets 15. It will be obvious that members 11 and 13 may be integral if desired but the form shown is preferred since there is less waste in metal than would be the case were the parts made integral. In the member 13, a horizontal slot 16 is provided adjacent the upper edge of the blade 11. A bolt aperture 17 is also provided in the member 13 adjacent the slot 16. A handle 19 of any suitable form such as the handles commonly employed on hoes, rakes, or the like, is provided which, at the lower end, is flattened at one side as shown at 20 for insertion in a ferrule indicated generally by the numeral 21.

The ferrule 21 comprises a base 22 and a semi-cylindrical member 23 provided with prongs or lugs 24 which pass through a corresponding number of slots 25 provided in the member 22. A bolt 26 is arranged to pass downwardly through members 22 and 23 as shown in Fig. 2, the lower end of the handle 19 being slotted upwardly a sufficient distance to accommodate the insertion of the same into the socket provided by the members 22 and 23 without first removing the bolt.

After a handle has been inserted in the socket of the ferrule, the bolt is tightened to clamp members 22 and 23 together and thus firmly hold the ferrule to the handle. The ready detachment of the handle provided by this construction of the ferrule enables the handles to be shipped in a bundle or bale and the heads in a separate package, the retailer assembling a handle to a head when he places them on display in his store, for example.

The base 22 of the ferrule is provided with a forward extension 27 of angular shape. This extension 27 is longitudinally slotted at 28 for receiving a fastening bolt 29 by means of which the ferrule is attached to the head 10. The extension 27 can be passed through the slot 16 as shown in Figs. 1 and 2 to dispose the forward portion 27a of the extension 27 in contact with the forward face of the member 13, after which the bolt 29 is passed through the opening 17 and the slot 28 for securing the head in fixed position with reference to the ferrule.

The member 27 is shown as being provided with a pair of downwardly directed lugs 30, the forward faces of which abut the head as shown in Figs. 1 and 2 to form a sturdy construction and to prevent the member 27 from flexing while the implement is in use.

When the handle is attached to the head as shown in Figs. 1 and 2, the blade 11 constitutes a hoe blade while the prongs 14 may be used for breaking up lumps in the soil or for other purposes upon merely turning the head over by rotating the handle. As shown, the cutting edge 12 of the blade runs somewhat on a bias or angle.

Upon removing the bolt 29, the head 10 can be turned through an angle of approximately ninety degrees (90°) from the position shown in Fig. 2 to the position shown in Figs. 3 and 4 wherein the blade extends forwardly of the handle. When so adjusted, the bolt 29 is again passed through the bolt hole 17 of the head and through the slot 28 for attaching the members rigidly in position. In this position of adjustment of the head the blade 11 constitutes a chopping tool or a scraping or prying implement whereby ice or snow may be scraped from a sidewalk, for example. When so used, the tines or prongs 14 lie on opposite sides of the lower end of the handle as illustrated in Figs. 3 and 4 and thus do not constitute obstructions to the free use of the tool for the purposes stated.

It will be seen, as shown in Figs. 3 and 4, that when the blade 11 is adjusted for use as a scraping or chopping tool, the impact transmitted by the blade to the ferrule is directed against the angular portion 27a of the extension 27, the bolt 29 serving merely to hold the parts firmly together. When used as a hoe as shown in Figs. 1 and 2, the portion 27 receives the impact and the bolt 29 in this instance also merely serves to hold the parts together.

While I have shown and described an embodiment of my improvements for the purpose of illustration, I do not wish to be restricted specifically thereto since various details in construction thereof may be employed without departing from the spirit of the invention.

What I claim as new and desire to cover by Letters Patent is:

An implement comprising a blade having a horizontally extending slot and an aperture adjacent the slot, a handle provided with a blade attaching means comprising a forwardly extending shank terminating in a forward end adapted to be passed through said slot and disposed at an angle for determining one working angle of the blade with respect to the handle, said forward end and contiguous portion of the shank having a longitudinal slot, and a releasable fastener adapted to pass through the aperture of the blade and through the slot of said blade attaching means for securing the blade in face to face contact with said angularly disposed shank end for effecting the disposition of the blade in one working position, said fastener being adapted also to be passed through said aperture and through another portion of the slot of the shank for securing the blade in a position wherein the latter contacts and is parallel with the shank and wherein said angular portion of the shank extends through the slot of said blade.

SEBASTIAN P. NEUHAUSEN.